United States Patent [19]
Ogawa et al.

[11] Patent Number: 5,103,371
[45] Date of Patent: Apr. 7, 1992

[54] CAPACITOR AND PROCESS FOR PRODUCTION THEREOF

[75] Inventors: Kazufumi Ogawa, Hirakata; Norihisa Mino, Settsu, both of Japan

[73] Assignee: Matsushita Electric Industrial Co., Ltd., Osaka, Japan

[21] Appl. No.: 683,857

[22] Filed: Apr. 11, 1991

[30] Foreign Application Priority Data

Apr. 20, 1990 [JP] Japan .................................. 2-106163

[51] Int. Cl.⁵ .......................... H01G 4/02; H01G 7/00; H01B 3/18
[52] U.S. Cl. ................................... 361/323; 29/25.42; 352/573
[58] Field of Search ............... 29/25.42; 361/323, 524, 361/527; 252/573

[56] References Cited

U.S. PATENT DOCUMENTS 4,843,517 6/1989 Maruyama et al. ................. 361/323

Primary Examiner—Donald A. Griffin
Attorney, Agent, or Firm—Stevens, Davis, Miller & Mosher

[57] ABSTRACT

Disclosed in this invention is a capacitor comprising a dielectric thin film being sandwiched by two layers of thin film electrodes directly or through interposition of a suitable thin film, and lead electrodes connected to said thin film electrodes, said dielectric thin film being a chemically adsorbed monomolecular film or a chemically adsorbed monomolecular built-up film made from a chlorosilane surface active agent. The molecules having large dipoles are incorporated in the molecules of the surface active agent to enhance the dielectric strength of the monomolecular film.

20 Claims, 6 Drawing Sheets

CAPACITOR AND PROCESS FOR PRODUCTION THEREOF

BACKGROUND OF THE INVENTION

This invention relates to a capacitor and a process for producing the same. More particularly, it pertains to a method for forming a dielectric thin film on a film electrode in the production of a capacitor.

For forming a dielectric thin film in the production of capacitors, there have been generally employed a method in which a polyester resin or an epoxy resin is coated on each film electrode and a method in which a polyester film is held between the film electrodes.

It has become apparent, however, that the dielectric films formed according to the conventional methods are poor in performance and unsatisfactory in reliability. For instance, it has been revealed that according to the conventional coating techniques, when the thickness of the coating film is reduced for enlarging the static capacity, although a satisfactory mechanical strength can be obtained, there arises a risk of forming many pinholes, which leads to a poor yield and greatly deteriorated environmental resistance and dielectric strength of the film.

SUMMARY OF THE INVENTION

In view of these defects of the conventional capacitors, the present invention has for its object to provide a small-sized high-performance thin film capacitor at low cost. More specifically, the present invention is aimed at eliminating said prior art defects and relates to a process for producing a capacitor of the type recited, characterized by comprising a step of forming one or more layers of pinhole-free monomolecular film with high dielectric strength on the surface of a thin film electrode according to a chemical adsorption method by using a chlorosilane surface active agent in the dielectric film coating operation in the capacitor production process, and to a capacitor obtained according to said process.

In an aspect of the present invention, there is provided a capacitor comprising a dielectric thin film being sandwiched by two layers of thin film electrodes directly or through interposition of a suitable thin film, and lead electrodes connected to said thin film electrodes, said dielectric thin film being a chemically adsorbed monomolecular film or a chemically adsorbed monomolecular built-up film made from a chlorosilane surface active agent.

In another aspect of the present invention, there is provided a process for producing a capacitor characterized by comprising a step of forming a layer of monomolecular film by having a chlorosilane surface active agent in a non-aqueous organic solvent chemically adsorbed on the surface of a metallic film electrode either directly or indirectly with interposition of an appropriate thin film so as to constitute chemical bonding of a siloxane (—SiO—) on said metallic electrode surface.

DESCRIPTION OF THE PREFERRED EMBODIMENTS

The present invention provides a capacitor characterized in that the electrode surface is coated, either directly or through a medium of an appropriate thin film, with a monomolecular chemically adsorbed film or a monomolecular built-up chemically adsorbed film composed of a chlorosilane surface active agent, and a process for producing such a capacitor.

According to the present invention, by use of chemical adsorption techniques, it is possible to form a thin film dielectric material having high moisture resistance and excellent dielectric strength and to provide a small-sized high-performance capacitor.

Further, the capacitor of this invention can be produced with ease and at low cost since the production process merely comprises chemical adsorption of a chlorosilane surface active agent on substrates for thin film metallic electrodes.

EXAMPLES

In the following, embodiments of this invention are described with reference to FIGS. 1 to 11.

Figure 1:
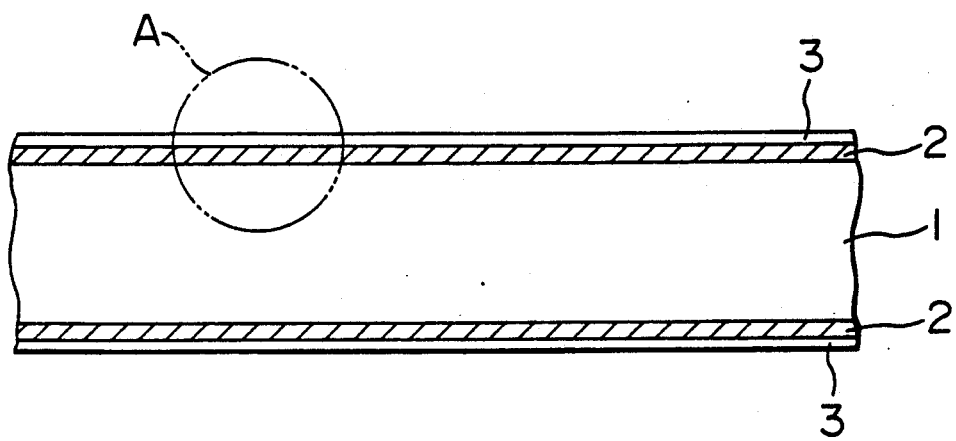
FIG. 1 is a diagrammatic illustration of a thin film electrode for capacitor having a chemical adsorption monomolecular film formed thereon as a dielectric film.

As shown in FIG. 1, on a film 1 made of a metal (such as Al, Sn, Cu, stainless steel or an alloy containing said metal(s)) designed to serve as a thin film electrode for capacitor and formed by suitable means such as rolling, there is formed a monomolecular dielectric film 3 made of a chlorosilane surface active agent by having said chlorosilane surface active agent adsorbed on said metallic film 1 by a chemical adsorption method either directly or with the intermedium therebetween of a suitable thin film such as a natural oxide film 2.

Instead of forming said natural oxide film 2, an electrolytic oxide film may be formed on said metallic film surface by means of electrolytic oxidation or a thin film of an oxide such as $Al_2O_3$, $SnO_2$, $Cu_2O$, or $Fe_2O_3$ may be formed on said metallic film surface to a thickness of several thousands of angstroms by suitable means such as sputtering deposition. This enables obtainment of a capacitor with even higher performance.

Chemical adsorption in the above operation can be performed in the following way. A hydrophilic metallic film 1 is dried well. Then a solution is prepared by dissolving a chlorosilane surface active agent, e.g., $CH_2=CH—(CH_2)_n—SiCl_3$ (n represents an integer preferably from 10 up to about 25 for best handling), in an 80:12:8 mixture (by weight ratio) of n-hexadecane, tetrachlorocarbon and chloroform to a concentration of $2\times10^{-3}$ to $5\times10^{-2}$ mol/l, and said metallic film 1 is dipped in this solution at room temperature for about one hour.

Figure 2:
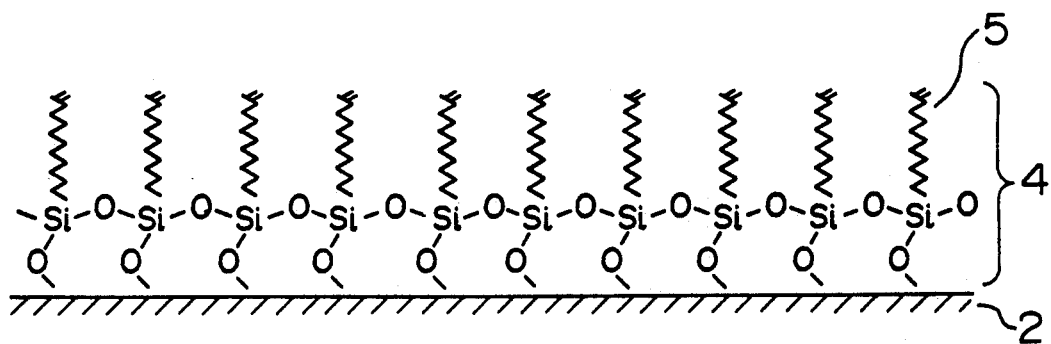
FIGS. 2 to 8 are diagrammatic representations of the steps shown by magnifying the encircled portion A in FIG. 1 to the molecular level.
Figure 3:
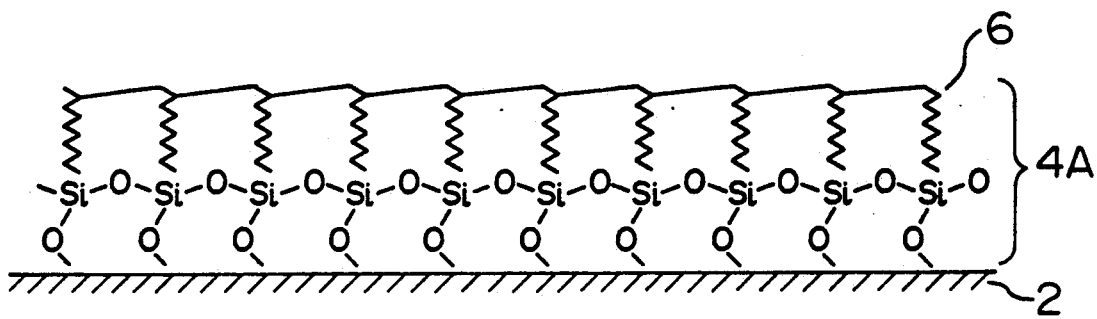

In this process, if an oxide is formed on the surface of said metallic film, it is hydrophilic, and —OH groups are contained in the film surface. Consequently, there takes place a dehydrochlorination reaction between —SiCl$_3$ groups and —OH groups to form bonding of siloxane (—SiO—), and as a result, as shown in FIG. 2, a dielectric film 3 made of a monomolecular chemically adsobed film 4 is formed, by the action of said chlorosilane surface active agent, on the surface of the monolayer metallic film 1 to a thickness of 20–30 Å. In FIG. 2, numeral 5 denotes a vinyl group.

It is possible to further strengthen and stabilize the monomolecular film 4 by crosslinking (indicated by 6 in FIG. 3) the vinyl groups ($CH_2=CH-$) 5 juxtaposed in the film surface by irradiating it with energy beams such as electron rays, X-rays, $\gamma$-rays, ultraviolet rays or ionic rays at a dose of 2 to 5 Mrad in an inert gas such as helium.

Figure 4:
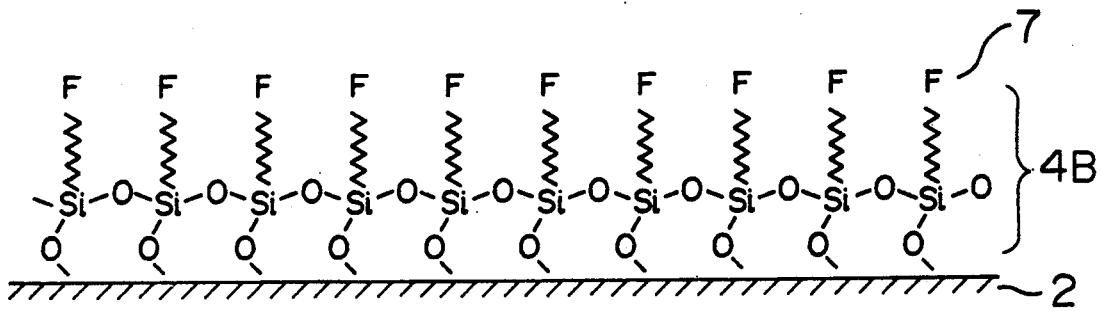

If a fluorine-containing surface active agent such as $CF_3-(CF_2)_n-(CH_2)_m-SiCl_3$ (m and n are the integers the sum of which is preferably from about 10 to about 25 for best handling quality) or $CF_3-(CF_2)_n-(CH_2)_m-O-SiCl_3$ (m and n are the integers the sum of which is preferably from about 10 to about 25 for best handling quality) is used as said chlorosilane surface active agent as shown in FIG. 4, there can be obtained a fluorine-containing adsorption film which is improved in dielectric constant. In FIG. 4, numeral 7 denotes a fluorine atom.

Figure 5:
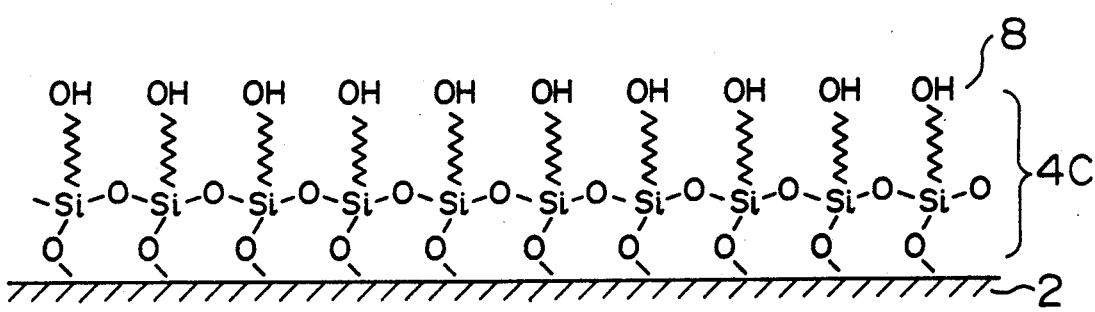
Figure 6:
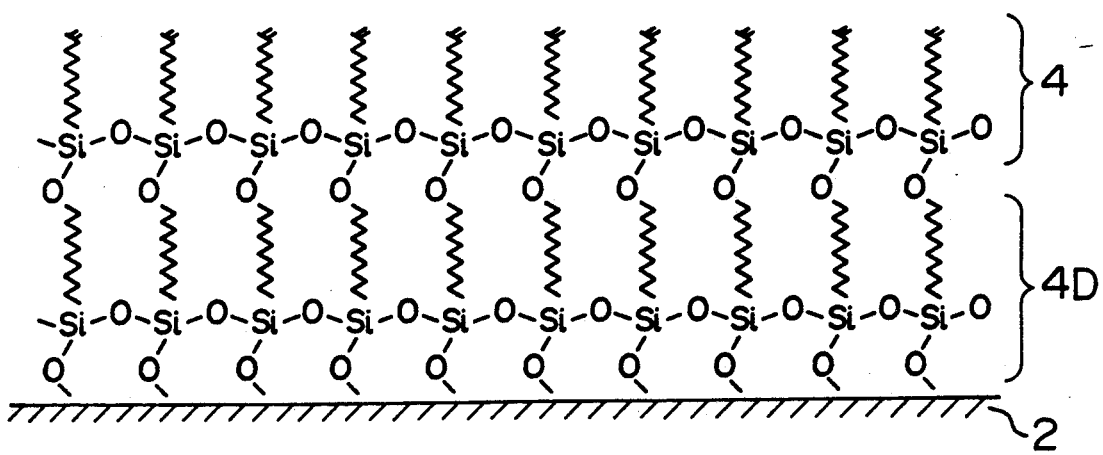

When it is desired to obtain a film with a slightly greater thickness, a metallic film formed with a single layer of monomolecular film 4 shown by FIG. 2 is dipped in a THF solution of diborane in a concentration of 1 mol/l at room temperature and then further dipped in a 30% $H_2O_2$ aqueous solution of sodium hydroxide (NaOH) in a concentration of 0.1 mol/l at room temperature for about one hour to add the hydroxyl groups (OH) 8 to the vinyl groups in the monomolecular film surface as shown in FIG. 5. Thereafter, by repeating the chemical adsorption step using the same reaction solution as used in the above-described adsorbing operation and the OH group addition step, it is possible to obtain a monomolecular built-up film having a desired thickness for use as a dielectric film such as shown in FIG. 6.

Also, in the step of adding hydroxyl groups 8, when radiation such as electron rays, X-rays, $\gamma$-rays or ionic rays are applied at a dose of 1–10 Mrad in an atmosphere of an inert gas such as oxygen, nitrogen or water vapor instead of performing the oxidation using a chemical, the active groups such as OH groups, amino groups ($NH_2$) or imino groups (NH) can be added to the portion of vinyl groups, so that by repeating the chemical adsorption step using the same reaction solution and the addition step by irradiation of energy beams, it is possible to obtain a required film thickness for use as a dielectric film.

The similar effect can be obtained by conducting a plasma treatment in an active gas atmosphere at 100 W for about 10 minutes instead of applying radiation as in the above embodiment.

Increase of dielectric constant of the monomolecular chemically adsorbed film can be effected by using as adsorbing reagent a chlorosilane surface active agent having a chemical structure with the molecules with large dipoles such as liquid crystal molecules at a part of the linear carbon chain of the chlorosilane surface active agent.

Figure 7:
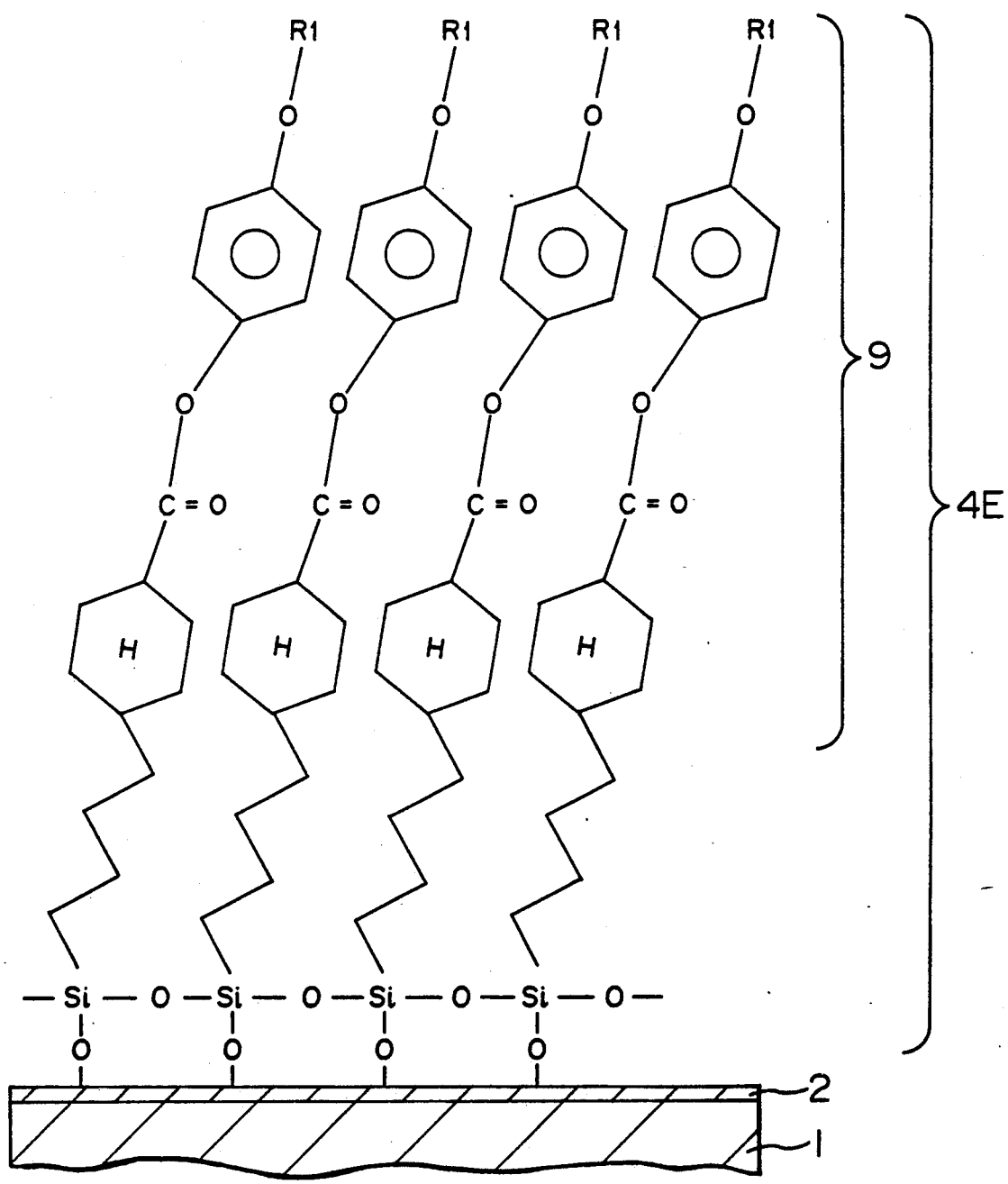
Figure 8:
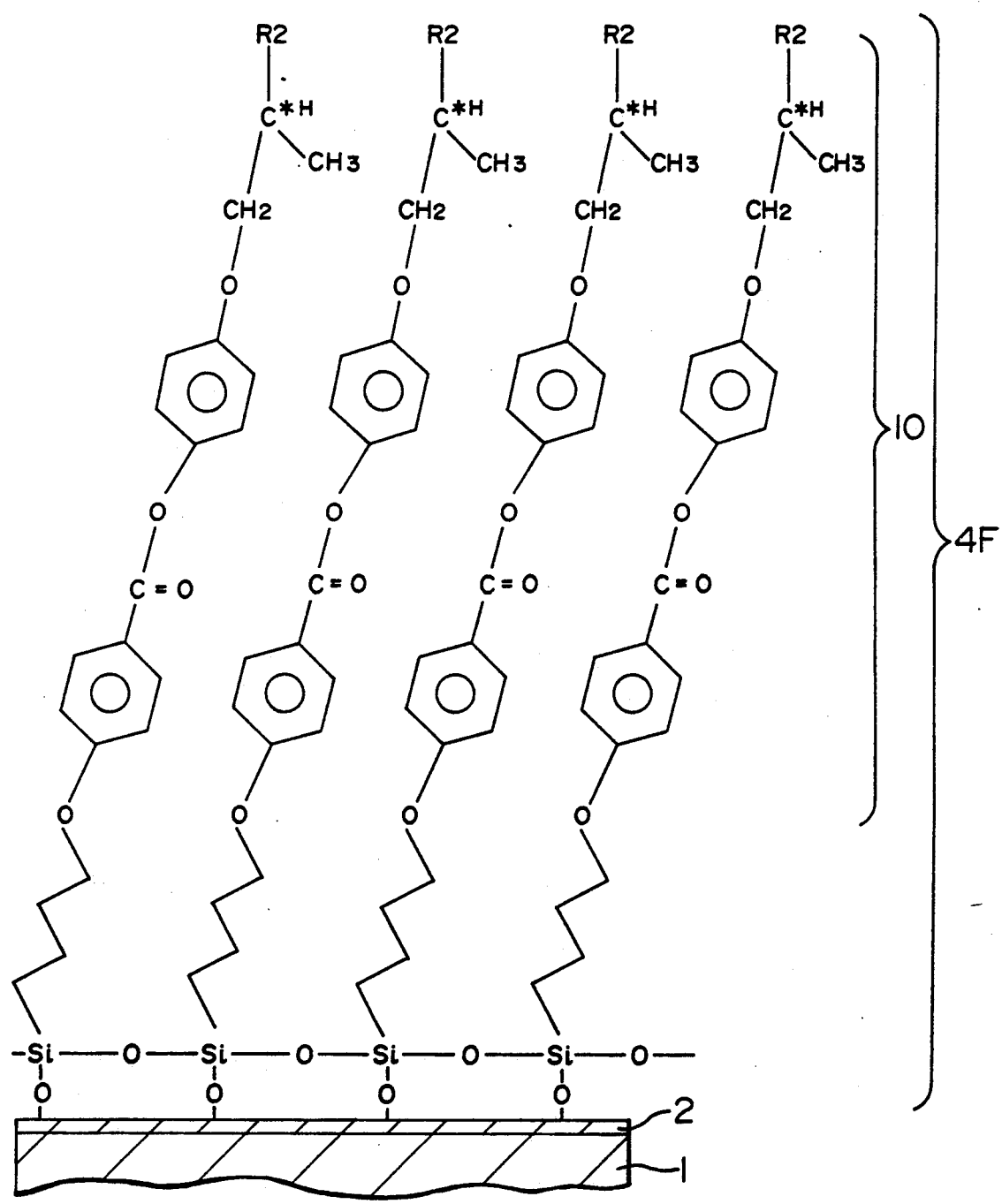

If an adsorption reagent prepared by adding trichlorosilyl groups, through a carbon chain, to the molecules of liquid crystal such as nematic liquid crystal or other ferroelectric liquid crystals such as azomethine type, azoxy type or ester type is used as the chlorosilane surface active agent having said liquid crystal molecules, it is possible to form a monomolecular film such as shown in FIG. 7 or FIG. 8. (In the representations of FIGS. 7 and 8, R1 and R2 each represents a substituent.) In FIG. 7, numeral 9 denotes a nematic liquid crystal portion, and in FIG. 8, numeral 10 denotes a ferroelectric liquid crystal portion. Further, in FIGS. 3 to 8, numerals 4A through 4F denote monomolecular films having different chemical structures.

In this process, if chemical adsorption of the adsorption reagent containing the liquid crystal molecules is conducted after said monomolecular built-up film has been formed, there can be obtained a monomolecular built-up film containing the liquid crystal molecules in the outermost surface.

Also, when R1 or R2 in the molecule of the chlorosilane surface active agent for chemical adsorption in FIG. 7 or 8 is defined to be a vinyl group, acetylene group or cyano group, it is possible to obtain a monomolecular dielectric built-up film containing the liquid crystal molecules in the whole structure of the monomolecular film by using the above-mentioned monomolecular film build-up method in which chemical adsorption is performed by treatments with a chemical agent or by irradiation.

Further, since the dielectric film thus obtained has a structure in which the dipoles in the molecules constituting each layer of monomolecular adsorption film are arranged in order, the obtained dielectric film can have a very high dielectric constant.

Figure 9:
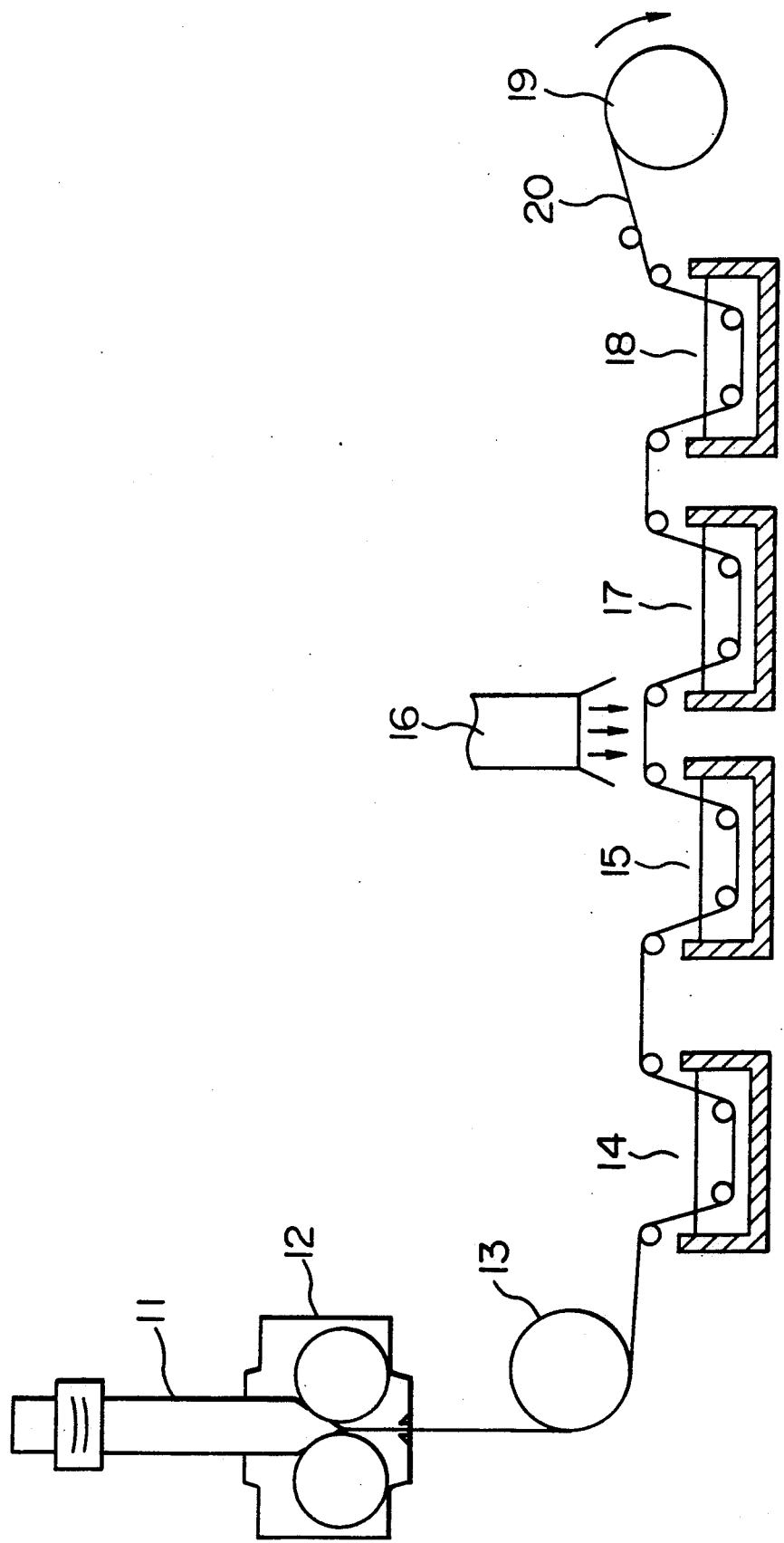
FIG. 9 is a schematic illustration of a process for continuously producing the thin film electrodes for capacitor having a dielectric film formed thereon.

According to a process where the above-described steps are conducted continuously, as shown in FIG. 9, a metal ingot 11 (e.g., Al or Al-containing alloy) is rolled into a film by a rolling mill 12, and by using a capstan 13, the film is subjected to the successive treatments in an adsorption tank 14, a washing cistern 15, an electron ray irradiator 16, an adsorption tank 17, a washing cistern 18 . . . , and lastly, after a desired number of layers of monomolecular film were obtained by repeatedly conducting said successive treatments, the thin film electrode for capacitor 20 compring the thus formed dielectric film is taken up on a drum 19. This process can be conducted continuously.

In case the natural oxide film is not sufficiently formed on the metallic film surface immediately after rolling, it needs to set, in the rear of the rolling mill, a tank containing an aqueous solution of dilute nitric acid or such for dipping the film therein for a short period of time. It is possible to add a step or steps before the adsorption step, such as a step for electrolytically oxidizing said metalltic film surface or a step for sputter-depositing a thin film of an oxide such as $SiO_2$.

As for the adsorbing reagent, $CH_2=CH-(CH_2)_n-SiO_3$ was used in the above-described embodiment, but it is also possible to use a reagent in which the vinyl group is replaced by acetylene or cyano group, or the trichlorosilyl group is replaced by dichlorosilyl or monochlorosilyl group, or a reaction group is allowed to coexist with said groups.

Figure 10:
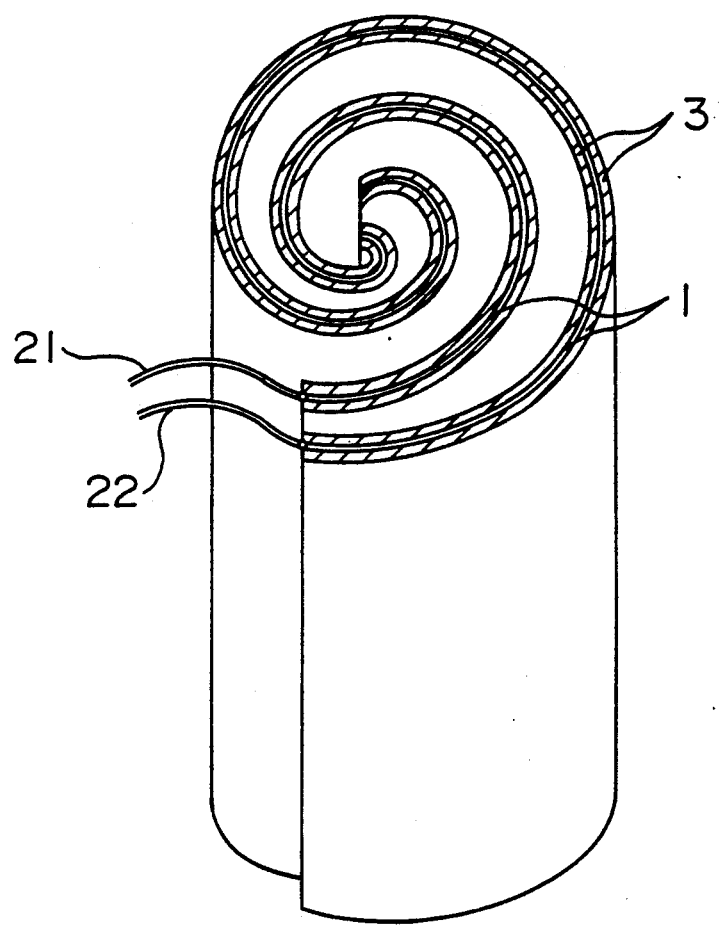
FIG. 10 is a perspective view of a capacitor produced in an embodiment of the present invention.
Figure 11:
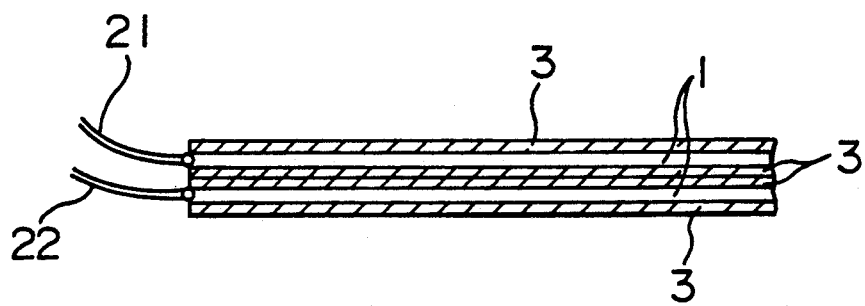
FIG. 11 is a schematic sectional view of a capacitor produced in another embodiment of the present invention.

Lastly, 2 sheets of thin film electrode formed with said dielectric film are placed one on the other and rolled up as shown in FIG. 10, or 2 sheets of thin film electrode are laminated and press-bonded as shown in FIG. 11, with lead wires 21 and 22 being connected to the respective sheets to complete a capacitor, wherein a second or another electrode may be deposited directly on the dielectric film 3 by sputtering.

If an electrolyte prepared by dissolving water or boric acid in an amount of a few percents in glycerin or ethylene glycol is held between the electrodes each having a coat of a monomolecular film of monomolecular built-up film, there can be obtained an electrolytic capacitor.

The present invention provides a capacitor characterized in that the electrode surface is coated, either directly or indirectly by interposing a suitable thin film, with a chemically adsorbed film or a chemically adsorbed monomolecular built-up film composed of a chlorosilane surface active agent, and a process for producing such a capacitor, so that according to this invention it is possible to easily form an extremely thin, high-density faultless dielectric film having a high dielectric constant on the surface of a metallic thin film electrode.

Also, since this dielectric film is bonded to the electrode surface through a strong siloxane bond, a small-sized high-performance capacitor with excellent moisture resistance and dielectric strength can be offered at notably low cost.

Further, since the dielectric film formed by said chemical adsorption method can be incorporated with a chemical structure having the molecules with large dipoles (e.g., nematic liquid crystal molecules or ferroelectric liquid crystal molecules), it is possible to control the dielectric constant of the dielectric film.

What is claimed is:

1. A capacitor comprising a dielectric thin film being sandwiched by two layers of thin film electrodes directly or through interposition of a suitable thin film, and lead electrodes connected to said thin film electrodes, said dielectric thin film being a chemically adsorbed monomolecular film or a chemically adsorbed monomolecular built-up film made from a chlorosilane surface active agent.

2. The capacitor according to claim 1, wherein the chlorosilane surface active agent has a linear carbon chain with 10 to 25 carbon atoms.

3. The capacitor according to claim 1, wherein the chlorosilane surface active agent has at one molecular end thereof a suitable substituent and at the other end molecular thereof a chlorosilyl group.

4. The capacitor according to claim 1, wherein the chlorosilane surface active agent is a compound in which chlorosilyl groups are bonded to part of the liquid crystal molecules through a carbon chain.

5. The capacitor according to claim 4, wherein the liquid crystal molecules are nematic liquid crystal molecules.

6. The capacitor according to claim 4, wherein the liquid crystal molecules are ferroelectric liquid crystal molecules.

7. The capacitor according to claim 6, wherein the ferroelectric liquid crystal is azomethine type, azoxy type or ester type.

8. The capacitor according to claim 6, wherein $CH_2=CH-(CH_2)_n-SiCl_3$ (wherein n is an integer) is used as the chlorosilane surface active agent.

9. The capacitor according to claim 1, wherein an electrolyte is held between a pair of opposing electrodes made by a chemical adsorption technique method using a chlorosilane surface active agent.

10. A process for producing a capacitor, which comprises a step of forming a single layer of monomolecular film on both surfaces of a metallic electrode by letting a chlorosilane surface active agent in a non-aqueous organic solvent be chemically adsorbed on the surface of the electrode-forming film either directly or by interposing therebetween a suitable thin film, and thereby effecting chemical bondings of siloxane.

11. The process according to claim 10, wherein the metallic electrode-forming film is made of Al or an Al-containing alloy.

12. The process according to claim 10, wherein the chlorosilane surface active agent has a linear hydrocarbon chain.

13. The process according to claim 12, wherein the linear carbon chain is terminated at one end thereof with a suitable substituent and at the other end thereof with a chlorosilyl group.

14. The process according to claim 10, wherein the chlorosilane surface active agent has a structure in which chlorosilyl groups are bonded to a part of the liquid crystal molecules through a carbon chain.

15. The process according to claim 14, wherein the liquid crystal molecules are nematic liquid crystal molecules.

16. The process according to claim 14, wherein the liquid crystal molecules are ferroelectric liquid crystal molecules.

17. The process according to claim 16, wherein the ferroelectric liquid crystal is azomethine type, azoxy type or ester type.

18. The process according to claim 10, wherein said chlorosilane surface active agent has at one end thereof a substituent selected from vinyl group, acetylene group and cyano group and has at the other end thereof a chlorosilyl group, said process further compring a step of reacting said substituent by a treatment with a chemical agent for adding a hydroxyl group and then effectuating chemical adsorption of said chlorosilane surface active agent, said step being performed after the step of forming a single layer of monomolecular film by having said chlorosilane surface active agent chemically adsorbed on the metallic electrode surface.

19. The process according to claim 18, wherein $CH_2=CH-(CH_2)_n-SiCl_3$ (n being an integer) is used as the chlorosilane surface active agent.

20. The process according to claim 10, wherein the reaction of the substituent is performed by application of radiation or a plasma treatment, and the process includes a step of effecting chemical adsorption of the chlorosilane surface active agent.

* * * * *